United States Patent [19]

Davies

[11] 4,370,689
[45] Jan. 25, 1983

[54] FLEXIBLE MAGNETIC RECORDING MEDIUM WITH IMPROVED REINFORCEMENT MEANS

[75] Inventor: Charles A. Davies, Los Gatos, Calif.

[73] Assignee: Dysan Corporation, Santa Clara, Calif.

[21] Appl. No.: 174,966

[22] Filed: Aug. 4, 1980

[51] Int. Cl.³ .......................... G11B 5/02; B44C 31/00
[52] U.S. Cl. ....................................... 360/135; 156/238
[58] Field of Search ......................... 360/135, 133, 99

[56] References Cited

U.S. PATENT DOCUMENTS 4,052,750 10/1977 Barber et al. ..................... 360/135
4,071,869 1/1978 Feierabend et al. ............... 360/135

FOREIGN PATENT DOCUMENTS 52-4210 1/1977 Japan .................................. 360/135

*Primary Examiner*—Robert S. Tupper
*Attorney, Agent, or Firm*—Townsend and Townsend

[57] ABSTRACT

A magnetic recording medium in the form of a floppy disk having a flexible body formed from a substrate and a magnetic coating on at least one of the two faces of the substrate. The body has a central hole concentric with the central axis of the disk and at least one of the faces of the body is provided with a reinforcing ring of a suitable material capable of being hot stamped, such as foil. The ring is directly bonded by being hot stamped under heat and pressure and without adhesive to the body in surrounding relationship to the hole. A second ring can be provided on the opposite side of the body in surrounding relationship to the hole and directly bonded to the body in the same manner as the first-mentioned ring. The rings can be electrically conductive or non-conductive and out of contact with each other. A method for hot stamping a ring to the body includes simultaneously applying heat and pressure to a sheet of foil placed over the body supported on a base so that a ring is formed from the foil sheet and the ring is directly bonded to the body while the remainder of the foil sheet, if any, is separable from the body when the body is removed from the supporting base. A second method includes applying a foil disk to the body before a hole is cut into the body; thereafter, the hole is formed, leaving the ring on the body in surrounding relationship to the hole.

11 Claims, 5 Drawing Figures

FLEXIBLE MAGNETIC RECORDING MEDIUM WITH IMPROVED REINFORCEMENT MEANS

This invention relates to improvements in the formation of flexible magnetic recording media and, more particularly, to an improved reinforcing means for the central portion of a flexible magnetic medium in the form of a floppy disk.

BACKGROUND OF THE INVENTION

In U.S. Pat. No. 4,052,750, a flexible magnetic recording medium is described as having a ring-like reinforcement member secured to either or both sides of the medium in surrounding relationship to the central hole therethrough. The reinforcing member is first provided with an adhesive coating on one side thereof and then applied under pressure directly to the medium so that an adhesive bond is established between the ring and the medium.

While the use of an adhesive for this purpose has been considered satisfactory in some cases, in other cases it is not satisfactory because the adhesive has a tendency to flow under heat and may not completely cover the faces of the ring and medium engaging each other. This results in an incomplete bonding of the ring to the medium, causing a poor reinforcement for the center of the medium. The ring can even become separated from the medium over a period of time during which the medium is placed on and taken off the hub of a disk drive system many times. Because of this drawback, a need has arisen for an improved reinforcement means which avoids the use of adhesive for securing the reinforcing means to the medium.

SUMMARY OF THE INVENTION

The present invention satisfies the aforesaid need by providing a magnetic recording medium having a flexible body provided with a central hole thereto which is surrounded by a reinforcing member which is directly bonded by being hot stamped to the body of the medium. Thus, there is no need for an adhesive for this purpose. To this end, the reinforcing member on the medium of the present invention is initially in sheet form separate from the medium and applied under heat and pressure directly to the medium so that a thermal, adhesiveless bond is produced in which the reinforcing member is completely in intimate, surface-to-surface contact with the medium itself. The reinforcing member is in the form of a ring concentric with the central hole through the medium and may or may not be electrically conductive. A second ring can be hot stamped on the opposite side of the medium. The second ring, if used, is concentric to the central hole and the first-mentioned ring yet the two rings can remain out of contact with each other.

The medium can be provided with a ring by first placing a sheet of foil over the medium and above the hole thereof when the medium is supported on a flat surface. Then a die is forced downwardly against the foil to apply heat and pressure simultaneously to the foil to cause a ring of the foil to be directly bonded or hot stamped to the body of the medium. When the die is elevated, the ring is secured in surface-to-surface contact with the medium body throughout the circumference of the ring. Any excess foil is stripped from the ring when the medium is lifted from the support surface. The medium can then be inverted and the process is repeated if a ring is to be hot stamped on the opposite side of the medium.

The primary object of the present invention is to provide an improved magnetic recording medium having a flexible body provided with a central hole therethrough wherein the body is provided with a reinforcing ring surrounding the hole and directly bonded to the body by being hot stamped thereto so that the bond between the ring and the body can be achieved without the use of adhesive and with only the application of heat and pressure.

Another object of the present invention is to provide a method of applying a reinforcing member capable of being hot stamped to a flexible magnetic recording medium in surrounding relationship to the central hole therethrough wherein the ring is directly bonded under heat and pressure to the medium body to avoid the need for an adhesive for this purpose.

Other objects of this invention will become apparent as the following specification progresses, reference being had to the accompanying drawing for an illustration of the invention.

IN THE DRAWING

Figure 1:
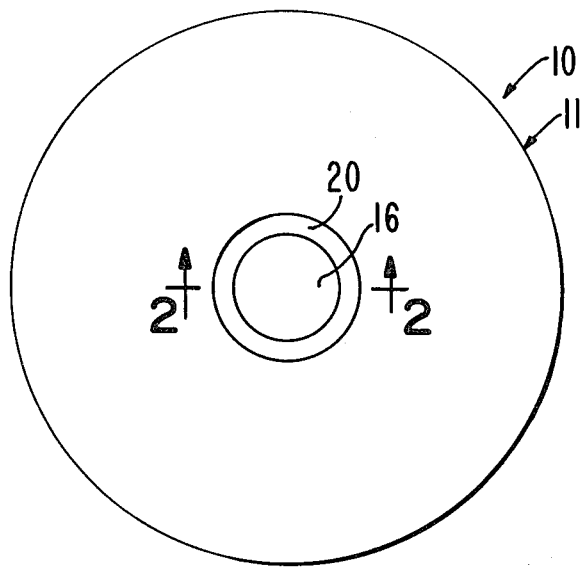
FIG. 1 is a plan view of a flexible magnetic recording medium showing a pair of reinforcing members hot stamped thereto in surrounding relationship to the central hole through the medium.

The flexible recording medium of the present invention is broadly denoted by the numeral 10 and is in the form of a floppy disk having a body 11 typically comprised of a Mylar substrate 12 provided with a magnetic coating 14 on at least one of the opposed flat faces of the substrate. The substrate has a hole 16 formed therein concentric with the central axis 18 of the medium.

A pair of reinforcing members or rings 20 are secured to opposite sides of body 11 in surrounding relationship to hole 16. Only a single ring 20 can be provided on body 11; however, two such rings provide optimum reinforcement for the central part of the medium.

Figure 2:
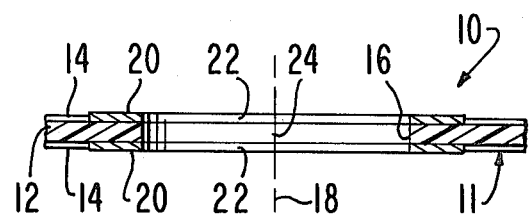
FIG. 2 is an enlarged, fragmentary, cross-sectional view taken along line 2—2 of FIG. 1.

Rings 20 have inner peripheral, cylindrical faces 22 which are coincident with the inner peripheral, cylindrical face 24 of substrate 12, and the rings are out of contact with each other. FIG. 2 shows these features on a greatly enlarged basis. Typically, the thickness of substrate 12 is about 10 mils and the thickness of each ring is about 1 to 3 mils.

The rings are hot stamped to body 11; thus, the rings are directly bonded to body 11 as distinguished from an adhesive bond which, as in the prior art, is effected by way of an adhesive placed between a reinforcing ring and the body. By virtue of the direct bond between rings 20 and body 11, no such adhesive is needed and the rings are in intimate surface-to-surface contact with the body throughout the entire areas of the rings. The rings therefore provide optimum reinforcement for body 11 and allow it to be used over and over again in a disk drive system without damage to the central part of medium 10 yet the rings are truly concentric with the central axis 18 of the disk to assure precise alignment on the hub of the disk drive system.

Figure 3:
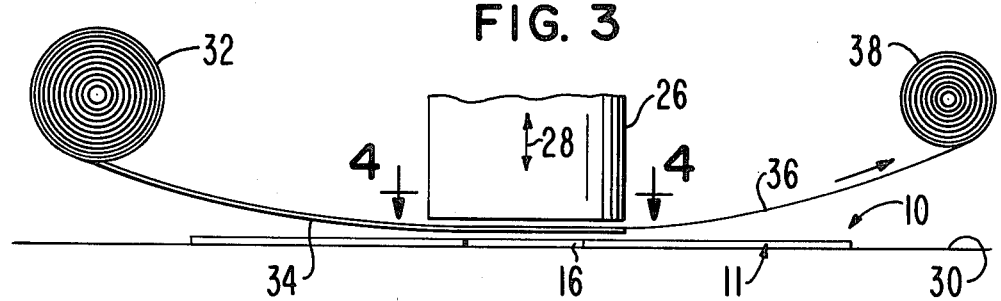
FIG. 3 is a schematic view of the apparatus and the material for use in hot stamping a reinforcing member to one side of the recording medium of FIG. 1, with the die of the apparatus being elevated and before the material is forced into hot stamping relationship to the medium.
Figure 4:
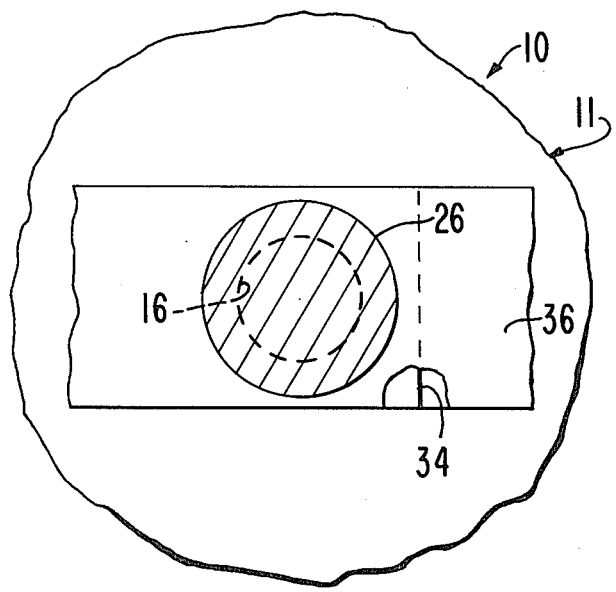
FIG. 4 is a cross-sectional view taken along line 4—4 of FIG. 3.

Typically, rings 20 are hot stamped to substrate 12 of body 11; however, the magnetic coating 14 on each face of the substrate may initially extend to hole 16. In such a case, rings 20 are hot stamped to the coatings. FIG. 3 shows a way of applying a ring 20 to medium 10. A heated die 26 moveable up and down in the direction of arrows 28 is provided above medium 10 which is shown as being supported on a flat surface 30. Hole 16 may initially have been formed in medium 10 before the medium is placed on surface 30 or the hole may be stamped after a disk of reinforcing material has been applied to each. The hole is formed in a conventional manner.

Figure 5:
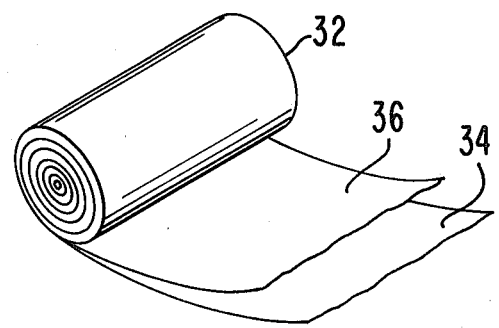
FIG. 5 is a perspective view of a roll of the reinforcing material showing a protective coating applied to one side of the material.

A roll 32 of a suitable reinforcing material capable of being hot stamped is provided at a location adjacent to die 26. This material can be a sheet 34 of metal foil typically covered by a protective sheet 36 of plastic or the like which is separable from foil sheet 34 in the manner shown in FIG. 5.

Foil sheet 34 and protective sheet 36 are moved as a unit beneath die 26 and above medium 10 and, when so positioned as shown in FIG. 3, foil sheet 34 is then forced into hot stamped relationship with the upper surface of body 11 of medium 10. The heat from die 26 and the pressure exerted by the die cause the hot stamping of the foil to body 11. Since the lower face of die 26 is circular, a disk of foil is applied in a hot stamping process by the die. This causes a ring 20 to be directly bonded to the medium if hole 16 is pre-cut. If the hole is not pre-cut, the hot stamping process causes a foil disk to be directly bonded to the medium and thereafter the stamping of the medium and the foil disk to form hole 16 results in the formation of ring 20.

The time in which the heat and pressure is applied to the foil can vary, depending upon the foil and the temperature of the die. This could be in the range of 1 second to 20 seconds or more. Typically, the temperature of the die and the pressure exerted by the die are selected so that they do not cause structural damage to body 11.

When the die is raised away from the medium, protective sheet 36 and any excess foil also can rise from the medium and can be fed to a take-up roll 38 on the opposite side of the die from roll 32. Protective sheet 36 is chosen so that it is not subject to the heat and pressure of the die. This permits a vehicle for the removal of excess foil from the medium.

If hole 16 is pre-cut, a center disk of foil which covers hole 16 during the hot stamping step, is left on surface 30 as medium 10 is raised from the surface. Thus, this center disk is cleanly separated from the ring 20 which is directly bonded to the medium.

After separation of medium 10 from support 30, the medium can be inverted and a second ring can be hot stamped to medium 10 by repeating the foregoing steps. Following this, other media 10 can be provided with reinforcing rings 20 by repeating the above steps. While the apparatus and method for hot stamping a ring 20 on body 11 has been described when respect to the FIG. 3 system, it is possible that other ways of hot stamping a ring 20 can be used. For instance, a ring of reinforcing material can initially be formed from a sheet of the material and the ring can then be applied to body 11 under heat and pressure and thereby be hot stamped to the medium. A suitable die for this purpose can be provided.

Rings 20 can be electrically conductive or electrically non-conductive depending upon the reinforcing material selected for forming the rings. If electrically conductive, they can permit the static electricity accumulated upon the surface of the medium, to be discharged in suitable manner.

I claim:

1. A magnetic recording medium comprising: a flexible body having a pair of opposed surfaces with a magnetic recording layer on at least one of said surfaces, and a central hole therethrough; and an annular reinforcing member of a material capable of being hot stamped, the member being hot stamped to one side of the body in surrounding relationship to the hole.

2. A magnetic recording medium as set forth in claim 1, wherein the annular reinforcing member has a face in surface-to-surface engagement with the adjacent surface portion of the body throughout the entire area of said face of said annular reinforcing member.

3. A magnetic recording medium as set forth in claim 1 wherein the body has an inner peripheral edge defining the outer boundary of the hole, the annular reinforcing member having an inner peripheral edge substantially co-extensive with the inner peripheral edge of the body.

4. A magnetic recording medium as set forth in claim 1, wherein is provided a second annular reinforcing member of said material, said second annular reinforcing member being hot stamped to the body on the opposite side thereof and in surrounding relationship to the hole.

5. A magnetic recording medium as set forth in claim 4, wherein said annular reinforcing members are devoid of mutual contact.

6. A magnetic recording medium as set forth in claim 4, wherein the body has an inner peripheral edge defining the outer boundary of the hole, and wherein each annular reinforcing member has an inner peripheral edge substantially co-extensive with the inner peripheral face of the body.

7. A magnetic recording medium as set forth in claim 1, wherein the reinforcing member material is metallic.

8. A magnetic recording medium as set forth in claim 1 wherein the reinforcing member material is a metal foil.

9. A magnetic recording medium having an improved central reinforcing structure, said recording medium comprising:
a relatively thin flexible body having a pair of opposing surfaces each provided with a magnetic recording layer, said body having a central substantially circular aperture defined by an inner edge of said body;
a first annular reinforcing member adhered to one of said pair of opposing surfaces by hot stamping said member thereto;
a second annular reinforcing member adhered to the other one of said pair of opposing surfaces by hot stamping said second annular reinforcing member thereto;
each of said first and second annular reinforcing members being positioned substantially concentric with said aperture and having an inner edge substantially coincident with said inner edge of said body.

10. A magnetic recording medium as set forth in claim 9 wherein said first and second annular reinforcing members are electrically conductive.

11. A magnetic recording medium as set forth in claim 9 wherein the ratio of the thickness of each of said first and second annular reinforcing members to the thickness of said body is in the range of about 0.1 to about 0.3.

* * * * *